United States Patent [19]

Delsing

[11] Patent Number: 5,932,812
[45] Date of Patent: Aug. 3, 1999

[54] METHOD AND DEVICES USE IN FLOW MEASUREMENT

[76] Inventor: Jerker Delsing, Kungsljusvägen 56, 240 21 Löddeköpinge, Sweden

[21] Appl. No.: 08/952,409

[22] PCT Filed: May 22, 1996

[86] PCT No.: PCT/SE96/00661

§ 371 Date: Nov. 13, 1997

§ 102(e) Date: Nov. 13, 1997

[87] PCT Pub. No.: WO96/37758

PCT Pub. Date: Nov. 28, 1996

[30] Foreign Application Priority Data

May 22, 1995 [SE] Sweden .................................. 9501895

[51] Int. Cl.$^6$ ............................... G01F 1/86; G08B 21/00
[52] U.S. Cl. ....................... 73/861.02; 702/100; 340/609
[58] Field of Search ........................... 73/861.02, 861.17, 73/1.17; 702/100, 104, 45; 340/609

[56] References Cited

U.S. PATENT DOCUMENTS

| | | | |
|---|---|---|---|
| 3,390,577 | 7/1968 | Phelps et al. ............................ | 340/609 |
| 3,992,680 | 11/1976 | Herzl ........................................ | 331/61 |
| 4,010,644 | 3/1977 | Bonfig et al. ........................ | 73/861.17 |
| 4,253,093 | 2/1981 | Johanson et al. ........................ | 340/609 |
| 4,704,908 | 11/1987 | Blatter ................................. | 73/861.17 |
| 4,890,491 | 1/1990 | Vetter et al. ........................... | 73/290 R |
| 5,060,522 | 10/1991 | Lew ..................................... | 73/861.02 |
| 5,152,181 | 10/1992 | Lew .................................... | 73/861.02 |
| 5,370,000 | 12/1994 | Herwig et al. ........................ | 73/861.17 |
| 5,586,045 | 12/1996 | Box et al. ................................ | 364/510 |

FOREIGN PATENT DOCUMENTS

| | | |
|---|---|---|
| 0219725 A1 | 4/1987 | European Pat. Off. . |
| 0521488 A2 | 1/1993 | European Pat. Off. . |
| 2410407 A1 | 9/1975 | Germany . |
| 3030851 A1 | 3/1982 | Germany . |
| 4205635 A1 | 8/1993 | Germany . |
| WO 91/10882 | 7/1991 | WIPO . |

OTHER PUBLICATIONS

Derwent's Abstract, No. 94–143344/17, Abstract of SU 1797695–A3, Arzamas Implus Exper Constr Bur, published Feb. 23, 1993.

*Primary Examiner*—Harshad Patel
*Attorney, Agent, or Firm*—Burns, Doane, Swecker & Mathis, L.L.P.

[57] ABSTRACT

In flow measurement, a measurement signal essentially representing the instantaneous flow rate is determined with the aid of a flow transducer (2) in a flowmeter (1). In order to check whether the flowmeter measures correctly or not, the noise in the measurement signal from the transducer (2) is analyzed. To be more specific, one or more distribution values for the measurement signal are determined and compared with predetermined reference values that have been determined for operating conditions for which the flow transducer is intended. If this comparison reveals that the existing operating conditions differ from those for which the flowmeter is intended, a frequency spectrum for the measurement signal may be determined and compared with reference spectra that have been determined for various known operating conditions, thereby to identify the existing operating conditions. If these are identified, the function of the flowmeter may be corrected on line with the aid of predetermined correction data.

23 Claims, 9 Drawing Sheets

METHOD AND DEVICES USE IN FLOW MEASUREMENT

FIELD OF THE INVENTION

This invention relates to methods used in the measurement of a fluid flow, wherein a measurement signal essentially representing the instantaneous fluid flow is determined with the aid of a flowmeter. The invention further concerns devices for flow measurement.

BACKGROUND OF THE INVENTION

The prior art encompasses various sorts of flowmeters which are built on different physical principles. Fluid flows may, for instance, be determined by measuring the pressure drop with the aid of an obstruction meter, measuring the vertical position of a suspended body with the aid of a rotameter, or measuring the transit time of an ultrasonic pulse through the fluid flow with the aid of an ultrasonic meter.

As a rule, a flowmeter contains a transducer emitting a measurement signal which essentially, in view of the method of measurement employed, represents the instantaneous flow rate affecting the transducer, as well as electronics for filtering the measurement signal and converting it to a flow output signal, which is adapted to a receiving unit, for instance a control system, and which often consists of an average value of the instantaneous flow rate for a certain period of time.

A common feature of most flowmeters is their sensitivity to the character of the fluid flow whose flow rate is to be measured, such that the output signal from the flowmeter is altered if the character of the fluid flow is altered, in spite of the fact that the flow rate remains the same. This phenomenon is often labelled "installation effects".

One distinguishes between static and dynamic installation effects. Thus, static installation effects are due to time-independent alterations of the flow profile, for instance caused by T-pipes, step-like diameter changes, tube bends or valves.

Dynamic installation effects, on the other hand, are due to time-dependent alterations of the fluid flow whose flow rate is to be measured. These time-dependent alterations, which for instance may consist of flow pulsations, are created by active components, such as pumps, compressors and rapid control valves. If, in a pulsating flow, the flowmeter averages the instantaneous flow rate during a period of time much exceeding the pulsation period, incorrect measurement results may be obtained.

Flowmeters are calibrated for a given flow profile, namely the fully developed flow profile obtained when an incompressible fluid has flown through a straight, circular conduit of a certain length. However, a real-life installation often differs from the calibration installation. As a result, the flowmeter may measure a flow having a flow profile other than the one for which it is intended or calibrated, which thus may result in an incorrect output signal from the flowmeter.

Furthermore, the flowmeter is calibrated for a certain flow-rate range, and it goes without saying that the flowmeter may emit an incorrect output signal if the measured flow rate is outside the calibrated range.

Moreover, certain types of flowmeters normally sample at a fixed sampling frequency. If the fluid flow pulsates, an unsuitable sampling frequency may lead to aliasing effects, such that an incorrect output signal is obtained.

Unless it is detected that the flowmeter measures incorrectly, the incorrect flow-rate values may lead to, for example, incorrect debiting in district heating systems, incorrect regulations in the process industry or incorrect dosages when mixing medicine or food. It is thus of the utmost importance that a flowmeter measures correctly or that one at the very least is able to find out whether it does so or not.

The installation effect problem being well known since long back, considerable efforts have been made to solve this problem.

One way of solving this problem, or at least reducing it, is to condition the flow such that a fully developed flow profile is obtained at the flowmeter. This may, for instance, be done by arranging a straight tube of constant diameter in front of the flowmeter, which however is not always possible from considerations of space, or by arranging a so-called "flow straightener" in front of the flowmeter. However, such a device introduces a pressure drop into the system, which is not always acceptable. If there are pulsations in the flow, these may further be reduced by the introduction of a damper.

Another way of solving the installation effect problem is by calibrating the flowmeter in situ or simulating the existing flow conditions. Should, however, the flow conditions be altered after the calibration, for instance as a result of changes in the system or changes in the function of a component, there is nevertheless a risk that the flowmeter will yield incorrect measurement values. In addition, it is not always possible to perform in-situ calibration, and this is at all events a time-consuming and expensive operation.

SUMMARY OF THE INVENTION

One object of this invention thus is to provide a method and a device making it possible to solve the installation effect problem, or at least reduce it.

Another object of the invention is to provide a method and a device making it possible to obtain, in operation, an indication of when the flowmeter measures incorrectly.

Yet another object of the invention is to provide a method and a device making it possible to identify the causes of incorrect flowmeter measurements, when such are detected.

A further object of the invention is to provide a method and a device making it possible, upon detection of incorrect flowmeter measurements, to correct the error without putting the flowmeter out of operation.

According to the invention, these objects are achieved by methods and devices having the distinctive features recited in the appended claims.

To be more specific, the invention is based on the insight that the noise in the measurement signal from a flowmeter contains information that may be used in order to decide whether the meter measures correctly or not and, should the occasion arise, identify the cause of incorrect measurement.

The instantaneous flow rate measured by the flowmeter may be written as: $v(t)=\bar{v}+v'$, wherein $\bar{v}$ is the average flow rate constituting the output signal from the flowmeter, and $v'$ is the noise normally simply filtered off in the flowmeter, the noise being thus defined as the deviation of the measurement signal $v(t)$ from the average flow rate. By analysing the frequency components of the measurement signal and/or its amplitude variations, one may, however, in accordance with the invention obtain an indication of whether the meter measures correctly or not.

Thus, it has been found that an alteration of the flow conditions for the flowmeter, for instance an altered installation leading to an altered flow profile, in relation to the flow conditions for which the flowmeter is calibrated, results in an alteration of the level and/or the spectral composition of the noise in the measurement signal from the transducer in the flowmeter. By comparing the current noise with a reference noise that has been determined for the flow conditions for which the flowmeter is calibrated or intended, one may thus obtain an indication of whether the meter measures correctly or not.

Accordingly, one way of analysing the noise is to determine the amplitude variations of the measurement signal for at least one predetermined period of time and to compare these amplitude variations with reference amplitude variations that have been determined in a similar manner. Suitably, the amplitude variations can be determined by the determination of a distribution value, for instance the standard deviation, of the amplitude of the measurement signal. If this distribution value differs from a reference distribution value which has been determined in similar fashion when the flowmeter operates under the conditions for which it is calibrated, for instance with a fully developed flow profile, or by simulation, this is an indication that the existing flow conditions differ from the reference flow conditions and that the flowmeter may thus yield an incorrect flow output signal. An increase, as well as a decrease, in the noise may be an indication of altered flow conditions. The current distribution value is therefore preferably compared with both an upper and a lower limit for what may be regarded as "normal" distribution under the flow conditions under which the flowmeter is intended to operate. Alternatively, the amplitude variations of the measurement signal may be determined by studying the time derivative of the amplitude of the measurement signal. Other values reflecting the amplitude variations of the measurement signal may, of course, also be used.

Another way of analysing the noise is to determine the frequency components of the measurement signal for at least one predetermined period of time. One suitable way of doing this is to determine a frequency spectrum, which advantageously can be done with the aid of Fast Fourier Transform (FFT) technique. Alternatively, a power spectrum may be determined. A simpler alternative would be to determine the standard deviation for a plurality of time periods of different length. Naturally, one may also resort to other methods yielding an indication of the frequency content of the noise. It goes without saying that the reference frequency components are determined in a manner similar to that of the frequency components of the measurement signal.

By analysing the noise, in particular its frequency spectrum, one may further identify different causes that there has been an error. If the cause of any incorrect measurement of the flowmeter can be identified, it will also be possible to automatically correct the errors, for instance with the aid of predetermined correction data stored in the flowmeter. The correction may, for example, be a correction of the measurement signal from the flow transducer, a correction of the output signal from the flowmeter or a correction of the function of the flowmeter, for instance an alteration of the sampling rate.

BRIEF DESCRIPTION OF THE FIGURES

In the following, an embodiment of the invention will be described in more detail with reference to the accompanying drawings in which.

DESCRIPTION OF PREFERRED EMBODIMENTS

Figure 1:
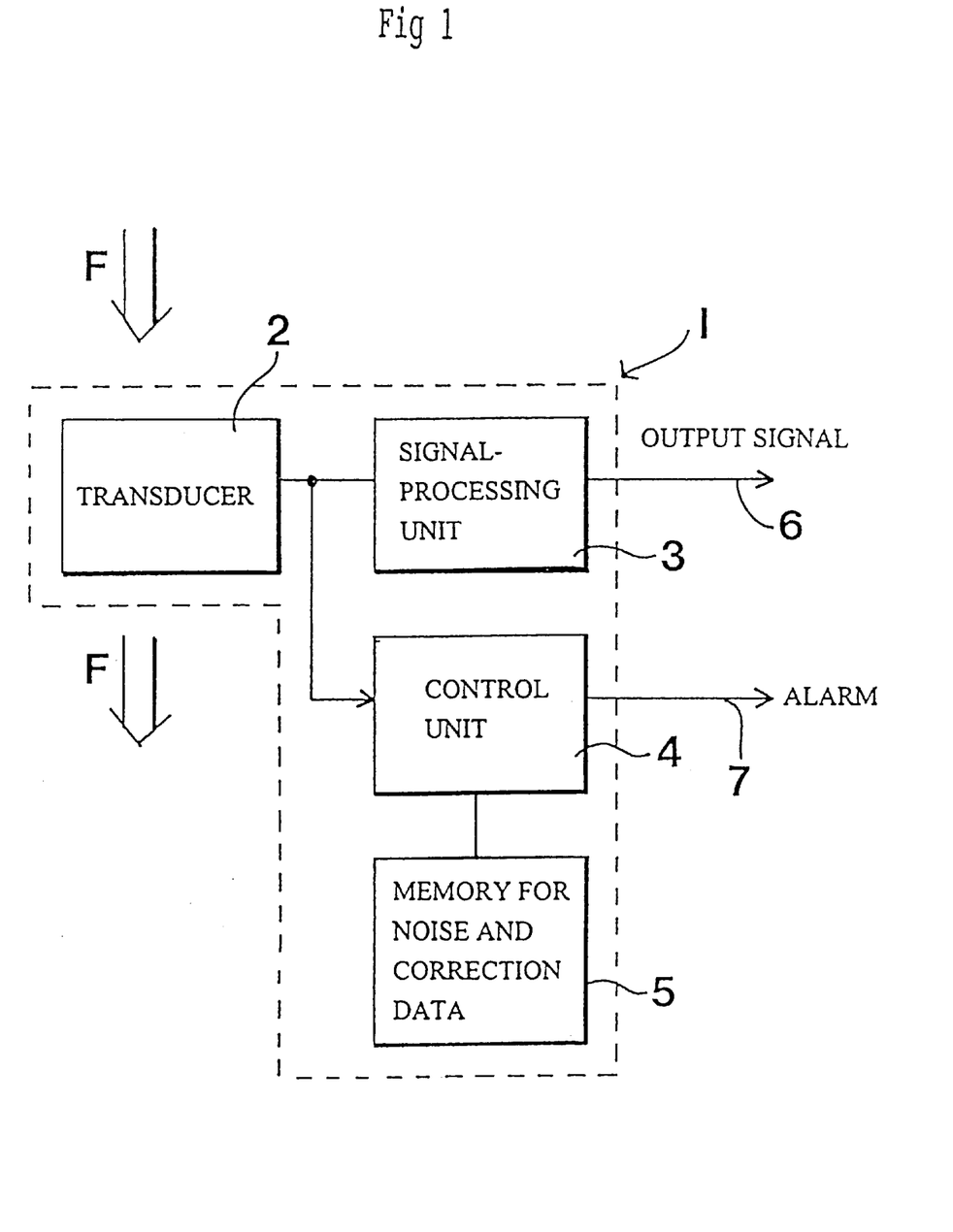
FIG. 1 is a block diagram illustrating a flowmeter for implementing the method according to the invention.

The method according to the invention may be implemented with all sorts of flowmeters. Thus, FIG. 1 schematically illustrates how a flowmeter for implementing the inventive method may be constructed. The flowmeter, which is generally designated 1, chiefly comprises a transducer 2, a signal-processing unit 3 and a control unit 4 with an associated memory 5. The transducer 2 and the signal-processing unit 3 can be made up of a conventional flowmeter, while the control unit 4 with its associated memory 5 constitutes a supplementary device which is used for implementing the inventive method.

As is schematically indicated with the aid of the arrows F, the transducer 2 is affected by the flow rate to be measured. The transducer may be in physical contact with the fluid flow, but need not be so.

The transducer 2 may be any type of transducer capable of emitting an output signal which essentially and in real time represents the instantaneous flow rate that affects the transducer in a way determined by the method of measurement employed. The output signal, which may be analog or digital, must have a time resolution that is relevant to the fluid-mechanic phenomena to which the transducer is exposed.

Many flowmeters that are available on today's market have a pulse output or an analog output, on which is available the above-mentioned transducer signal. A specific example is the turbine flowmeter FT8-8AEEI-GAE-I from Flow Technology Inc. This meter, which is intended for gas, has a pulse output on which is obtained a pulse signal, in which each pulse corresponds to the detection of a passing turbine blade. Another specific example is the one-jet fan wheel meter SVMV 444 S, which is intended for liquid and is manufactured by AB Svensk Värmemätning, Sweden.

The signal-processing unit 3, which is connected to the transducer 2, preferably contains a microcomputer with software for processing the signals from the transducer in a suitable fashion. The software should, for instance, filter and/or calculate the average of the measurement signal from the transducer in order to achieve a flow output signal representing the measured flow rate in the form of a voltage or a current, or in some other suitable fashion represents the flow rate, on an output 6 from the flowmeter. The signal-processing unit 3 is encompassed by the prior art and will therefore not be described in any more detail here. For more information on the construction of prior-art flowmeters, reference is instead had to reference literature in this field, such as Flow Measurement, O. W. Spitzer, Ed. ISBN 1-55617-334-2, ISA 1991 or Flow Measurement Engineering Handbook, Miller R. W., 2nd Ed., McGraw-Hill Publ. 1989.

The control unit 4, which has an input from the transducer 2, an output to the signal-processing unit 3 and an alarm output 7, is preferably made up of a computer having software for determining the amplitude variations and frequency components of the measurement signal from the transducer 2. The software may consist of commerciallyavailable programs, such as Matlab from Matworks Inc., the US or NAG, Fortran Library from Numerical Algorithms Group LTD, Great Britain.

In the memory 5 associated with the control unit 4, there is stored reference noise in the form of reference amplitude variations and reference frequency components, which have been measured for specific flow conditions, as well as correction data used for deciding whether the meter measures correctly and to carry out any corrections needed. The memory 5 may, for example, be of read-memory type. Instead of storing reference noise in advance, one may store reference noise when installing the flowmeter, such that the reference noise is the noise occurring under the flow conditions prevailing during the installation.

Figure 2:
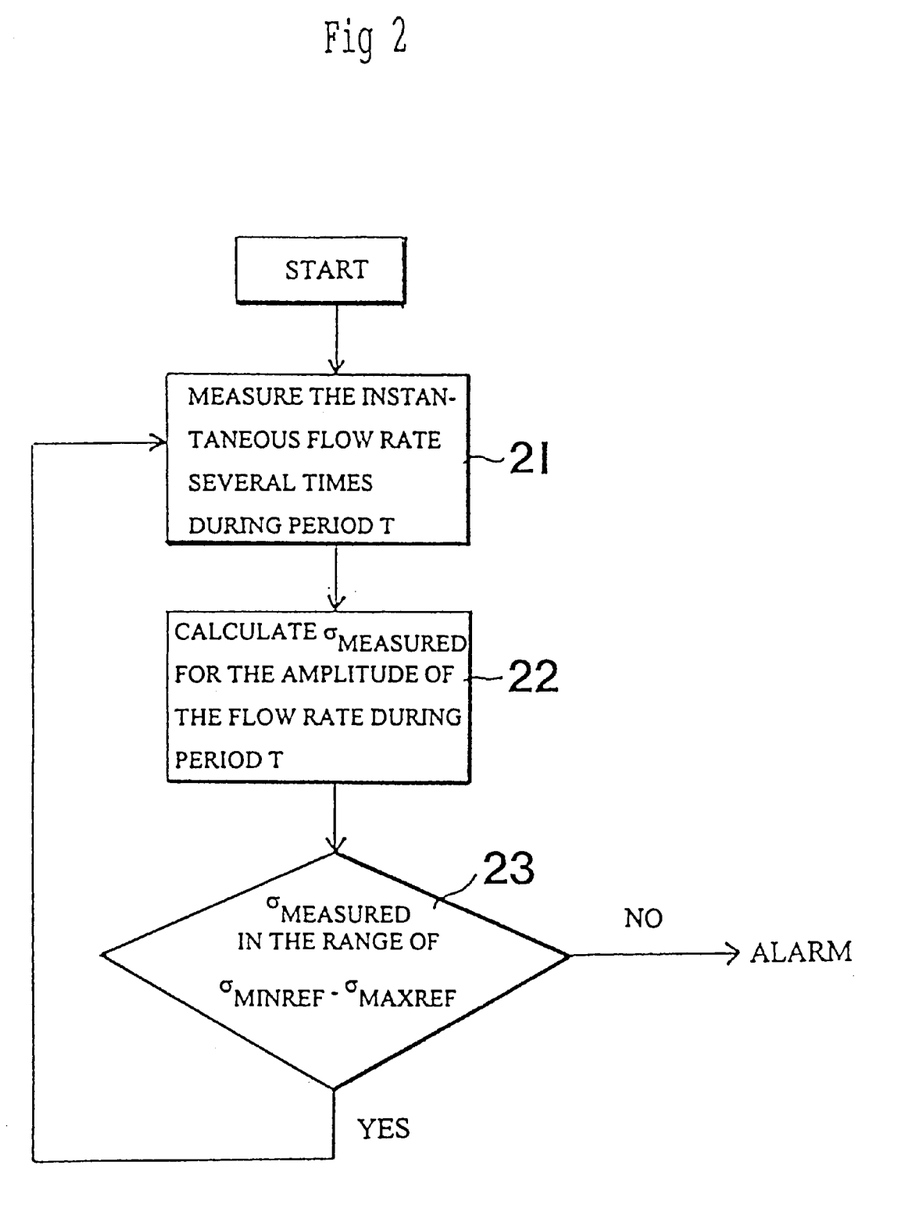
FIG. 2 is a flow chart illustrating a first mode of implementation of the method according to the invention.

In a simpler mode of implementation of the invention, which is exemplified in FIG. 2, the noise is analysed with a view to detecting whether the meter measures incorrectly, in which case an alarm is given. In a more advanced mode of implementation, which is exemplified in FIG. 3, the error is, in addition, identified and corrected.

In a first step 21 of the mode of implementation illustrated in FIG. 2, the transducer 2 measures the instantaneous flow rate continuously or samples it a great many times during a period of time T, resulting in a high time resolution. How high the sampling frequency needs to be is determined by the application at issue. In general, the sampling frequency should be twice as high as the frequency for major changes in the flow amplitude. As expressed in figures, the sampling frequency should normally be in the range of 0.01 Hz-10 kHz.

The transducer 2 need not determine the instantaneous flow rate with an equally high time resolution all the time, but it is sufficient that a high time resolution is used when the meter is to be checked, which may be done intermittently. In normal operation with no control of the function of the flowmeter, the measurement signal from the transducer 2 is transmitted directly to the signal-processing unit 3, whereas during the control procedure, the measurement signal from the transducer 2 passes the control unit 4 before arriving at the signal-processing unit 3.

In order to simplify the processing in the control unit 4, the period of time T is advantageously at least 30 times the sampling period. The duration of the period of time T may be adaptive. Preferably, a comparatively long period is used at the beginning of the control procedure, and this period may be gradually shortened if the long period does not prove to provide more information than a shorter part thereof.

In a second step 22, the control unit 4 calculates the standard deviation $\sigma$ or some other function which reflects the distribution of the amplitude of the measurement signal during the period of time T. Preferably, the standard deviation for several different periods of time may be determined, resulting in a certain indication of the frequency content of the noise.

Then, the control unit 4 compares, in a third step 23, the calculated standard deviation $\sigma$ measured with one or more reference values stored in the memory 5. The reference values are also made up of standard deviations that have been determined for the same period of time T with the aid of the flowmeter and under the operating conditions for which the meter is intended or calibrated. Alternatively, the reference values may be determined by simulation and may, for instance, consist of a lower and/or an upper limit value for the noise $\sigma_{minref}$ and $\sigma_{maxref}$, respectively. If the standard deviation has been determined for several periods of time of different length, the comparison naturally involves the corresponding reference values.

If the comparison in step 23 indicates that the noise is outside the reference range, an alarm is given on the output 7, whereupon the measurement proceeds according to step 21. Otherwise, the measurement proceeds immediately according to step 21. In some cases, the size of the standard deviation may give an indication of the reason why the meter measures incorrectly, in which case the output signal or the function of the flowmeter can be corrected on line in a manner that will be described below. Preferably, the control unit 4 registers during which periods of time an alarm is given, so that the function of the flowmeter can be checked afterwards.

Figure 3:
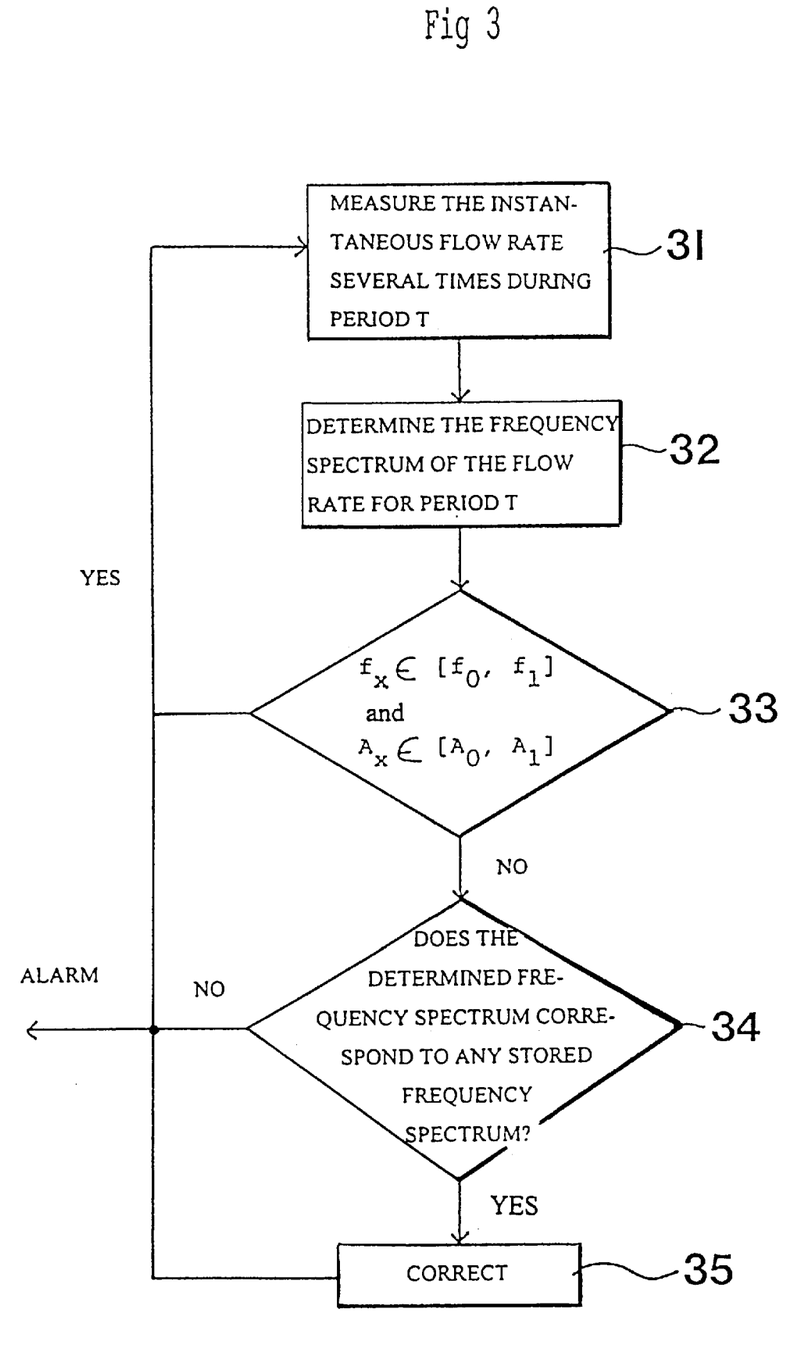
FIG. 3 is a flow chart illustrating a second mode of implementation of the method according to the invention.

In the slightly more advanced mode of implementation illustrated in FIG. 3, the instantaneous flow rate is measured or sampled with the aid of the transducer 2 in a first step 31. In a second step 32, a frequency spectrum for the measurement signal from the transducer 2 is determined for the period of time T, the latter being chosen in the manner indicated above. In order to obtain an indication of whether the flowmeter measures correctly or not, the control unit 4 controls, in a third step 33 that may be dispensed with, whether the frequencies $f_x$ and amplitudes $A_x$ of the measurement signal are within a predetermined frequency range ($f_0$, $f_1$) and a predetermined amplitude range ($A_0$, $A_1$), respectively. If this is so, the meter is considered to measure correctly, and the flow reverts to step 31. If this is not so, the existing frequency spectrum is, in step 34, compared with different reference spectra which are stored in the memory 5 and which have been measured for various known operating conditions, for instance for pulsating flows of varying amplitudes and frequencies, for different installations with different tube bends, and for the case with deposits on the flow transducer. If the control unit 4 is able to identify the existing operating conditions with the aid of the reference spectra, the measurement signal is, in step 35, corrected on line with the aid of correction data for the identified operating conditions, before the thus-corrected measurement signal is transmitted to the signal-processing unit 3. Alternatively, the mode of operation of the flow transducer can be corrected. If, say, it has been detected that the measurement signal contains pulsations, a jitter may be applied on the sampling frequency of the flow transducer in order to avoid aliasing effects. The correction data stored in the memory 5 may be stored as functions of Reynolds' number, in tabular form or in some other suitable fashion. If the existing operating conditions cannot be identified, an alarm is given and the processing proceeds according to step 31. The correction depending on the identified operating conditions may alternatively be carried out in the signal-processing unit 3 and alternatively be carried out on the output signal instead of the measurement signal.

The modes of implementation illustrated in FIGS. 2 and 3 may further be combined in various ways. For instance, the standard deviation may be used to decide whether the flowmeter measures correctly or not, and the frequency spectrum may be used to decide which are the existing operating conditions and make corrections in view thereof.

Figure 4:
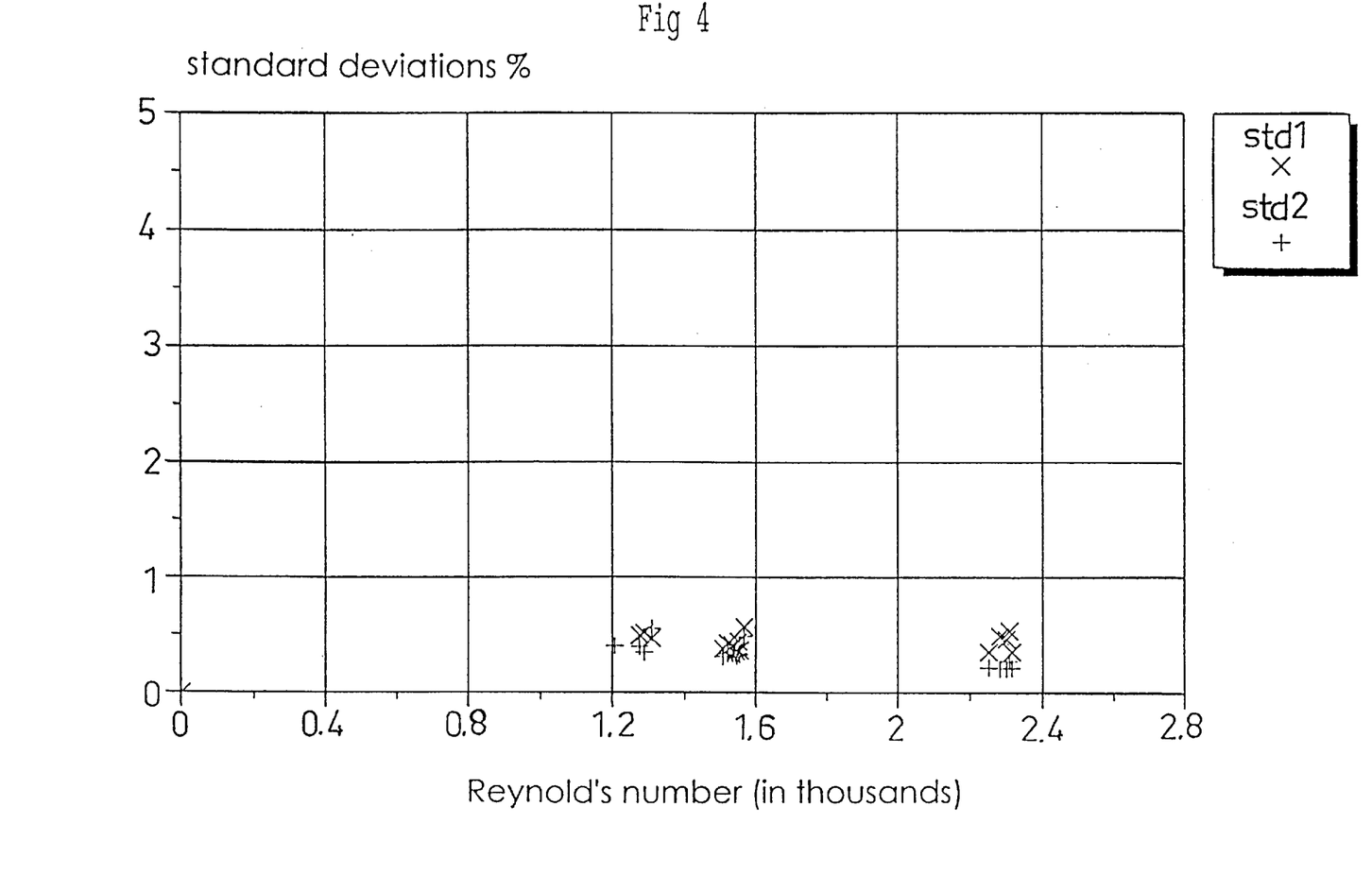
FIGS. 4–9 are diagrams illustrating the standard deviation for the measurement signal from a flow transducer as a function of Reynolds' number for various flow conditions for the flow transducer.
Figure 5:
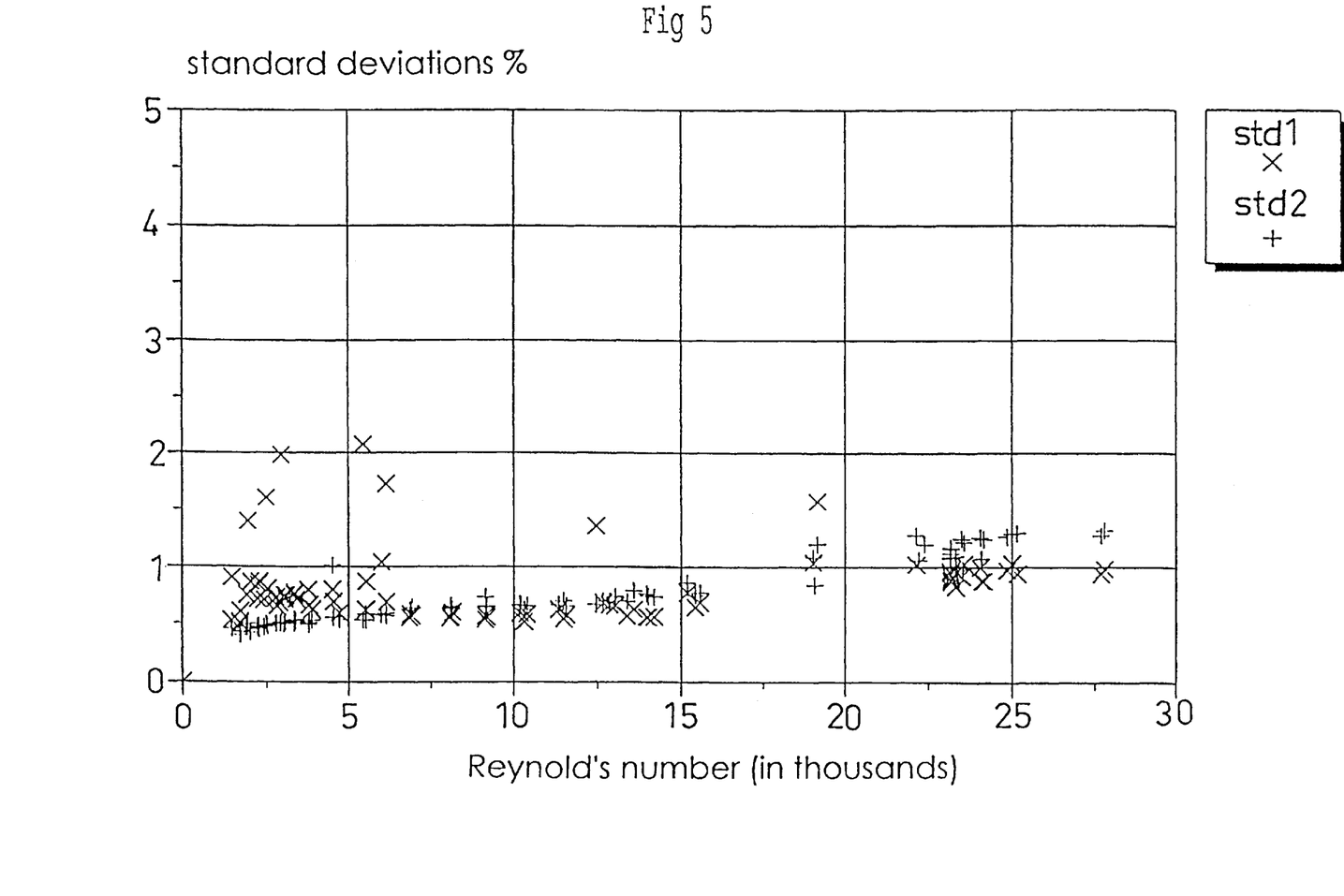
Figure 6:
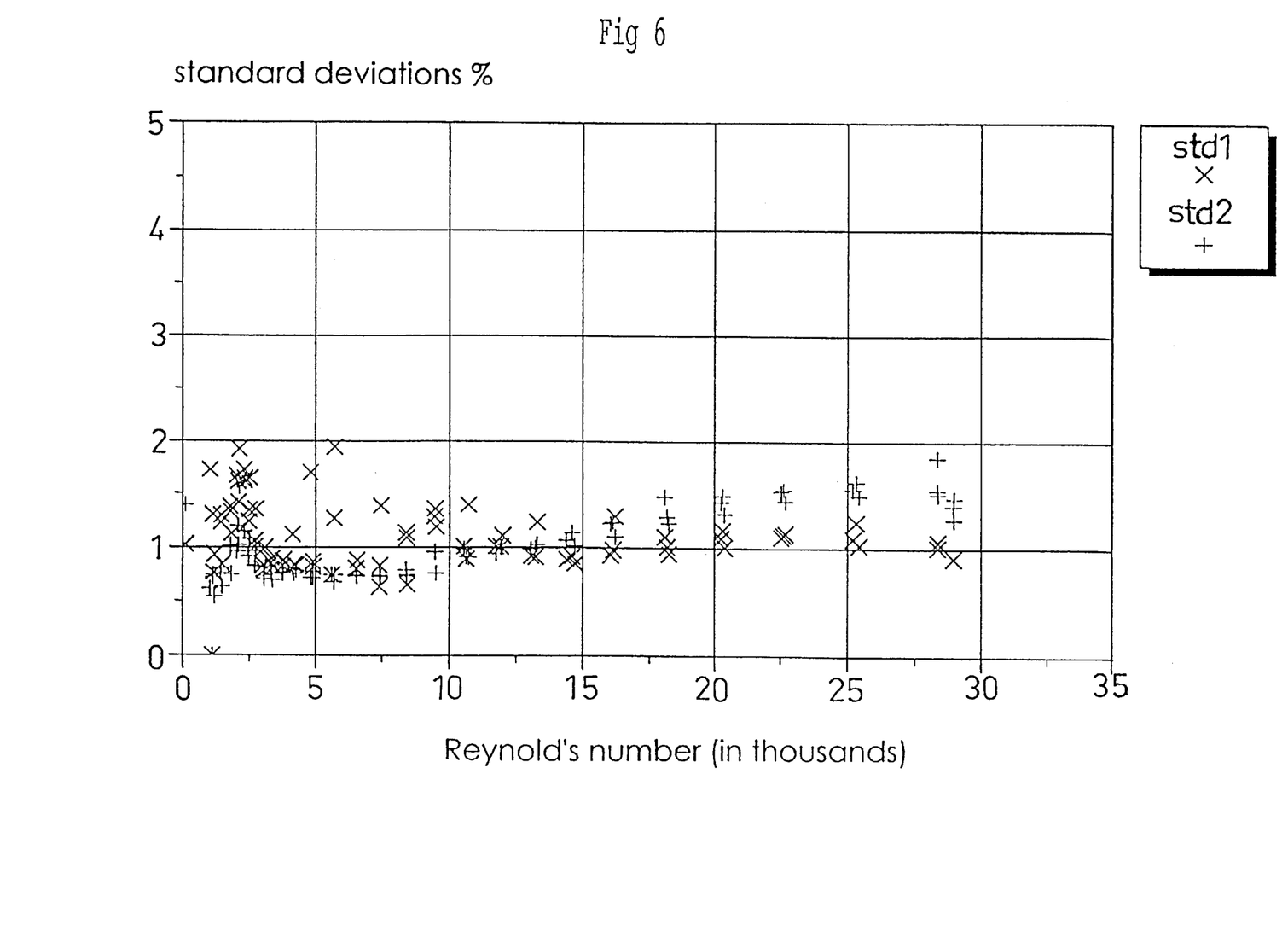

FIGS. 4–6 are three different diagrams for the standard deviation of the amplitude of a flow as a function of Reynolds' number. All the flows have been measured with an ultrasonic flowmeter having a sampling period of about 50 ms. The standard deviation 1 has been determined for a period of time of 0.7 s, and the standard deviation 2 has been determined for a period of time of 7 s. In all the cases, the flow has been generated with the aid of a fall container. In the measurement corresponding to FIG. 4, there is a straight stretch of 100 times the tube diameter before the meter, in the measurement corresponding to FIG. 5, there is simple tube bend 12 tube diameters before the meter, and in the measurement corresponding to FIG. 6, there is a double tube bend in different planes 12 tube diameters before the meter. In each of the diagrams, three measurements are accounted for.

In FIG. 4, which corresponds to an ideal installation, both standard deviations 1 and 2 are approximately 0.5%. In FIG. 5, especially the standard deviation 1 increases even at low Reynolds' numbers, whereas in FIG. 6, both standard deviations 1 and 2 are on a higher level than in FIG. 4 even at low Reynolds' numbers.

As is evident from FIGS. 4–6, the size of the standard deviation thus increases, as measured over different periods of time, when there is a transition from the ideal installation conditions in FIG. 4 to the non-ideal installation conditions with one or two tube bends in FIGS. 5 and 6.

Figure 7:
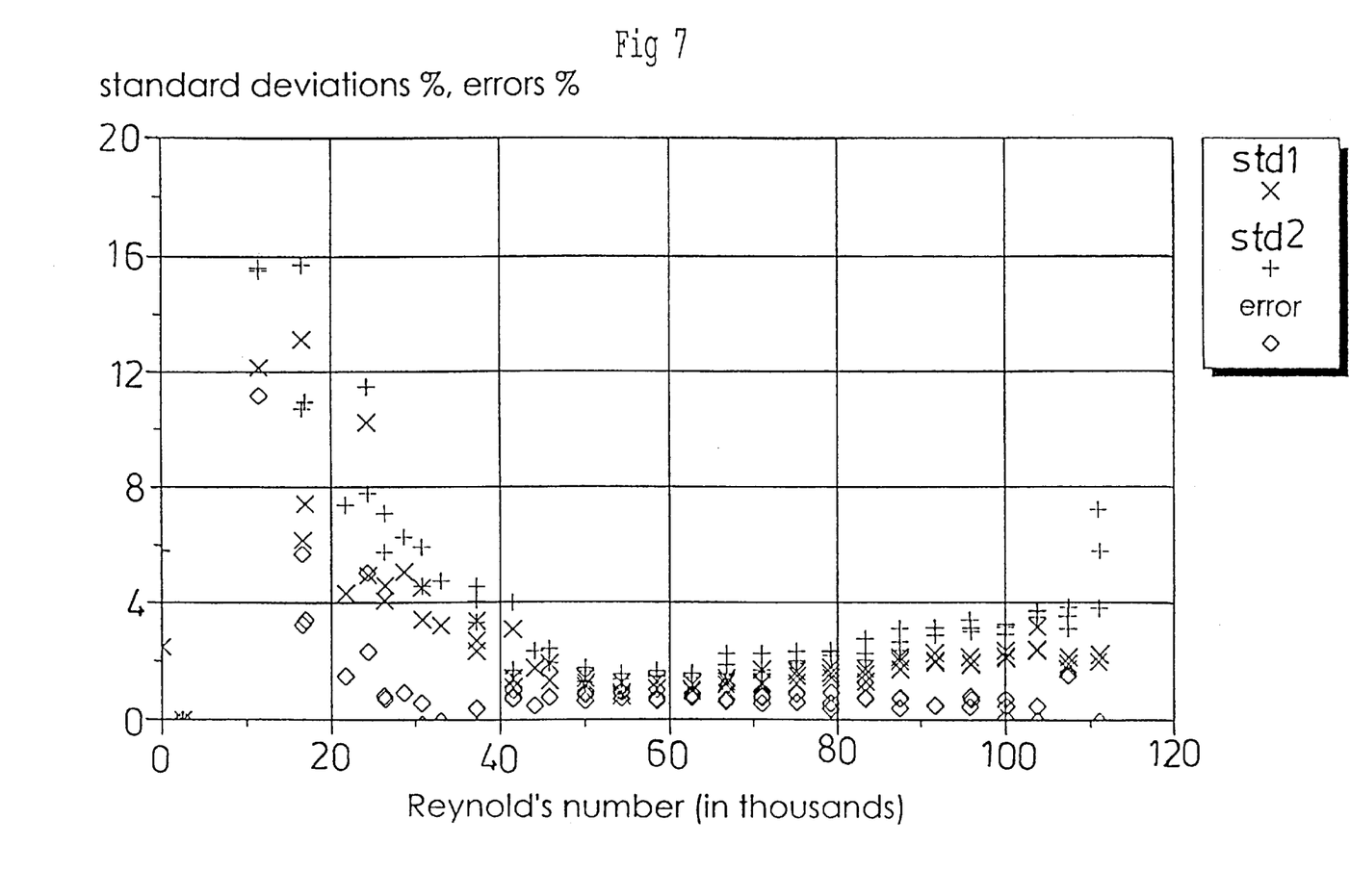
Figure 8:
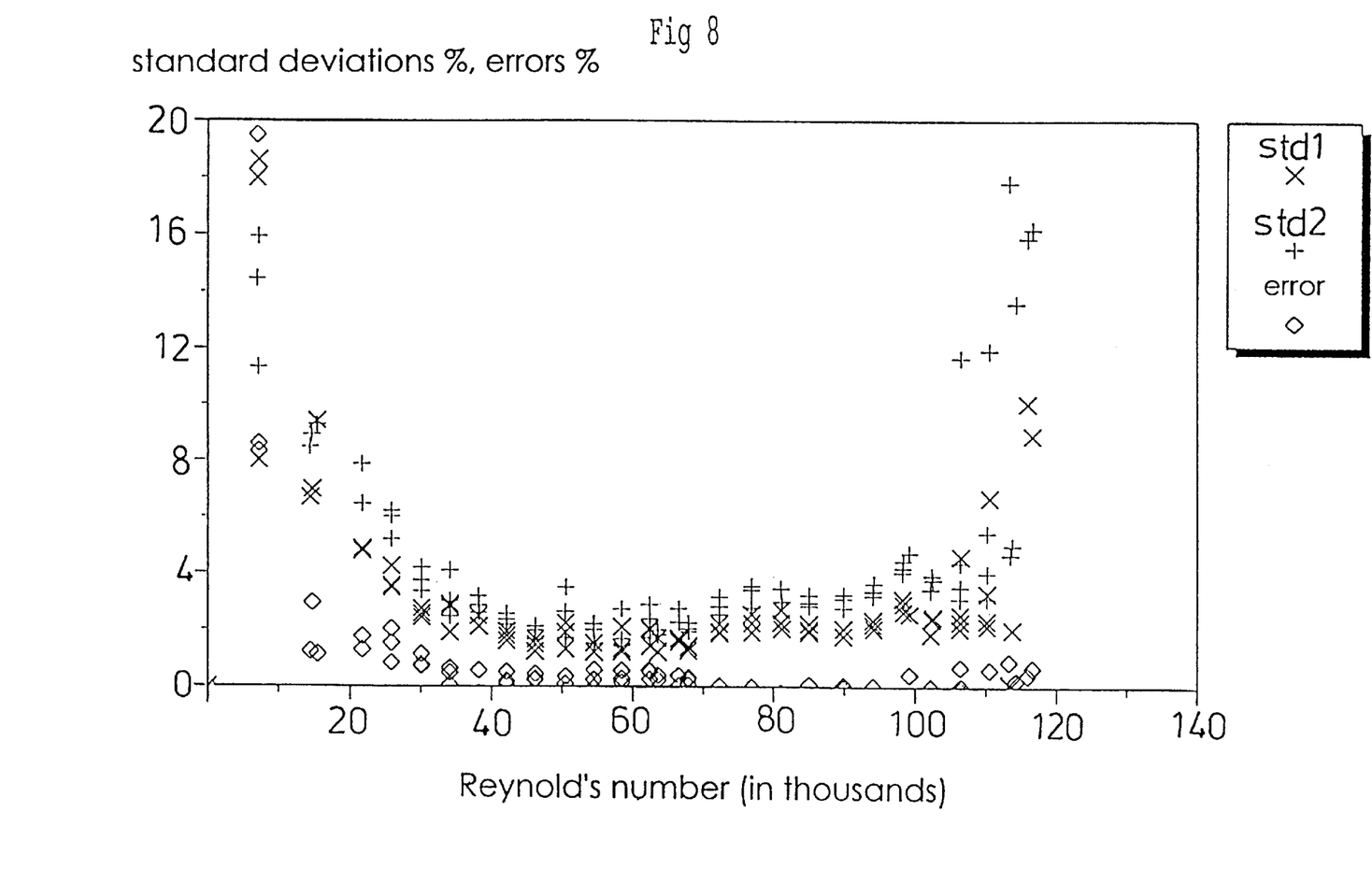
Figure 9:
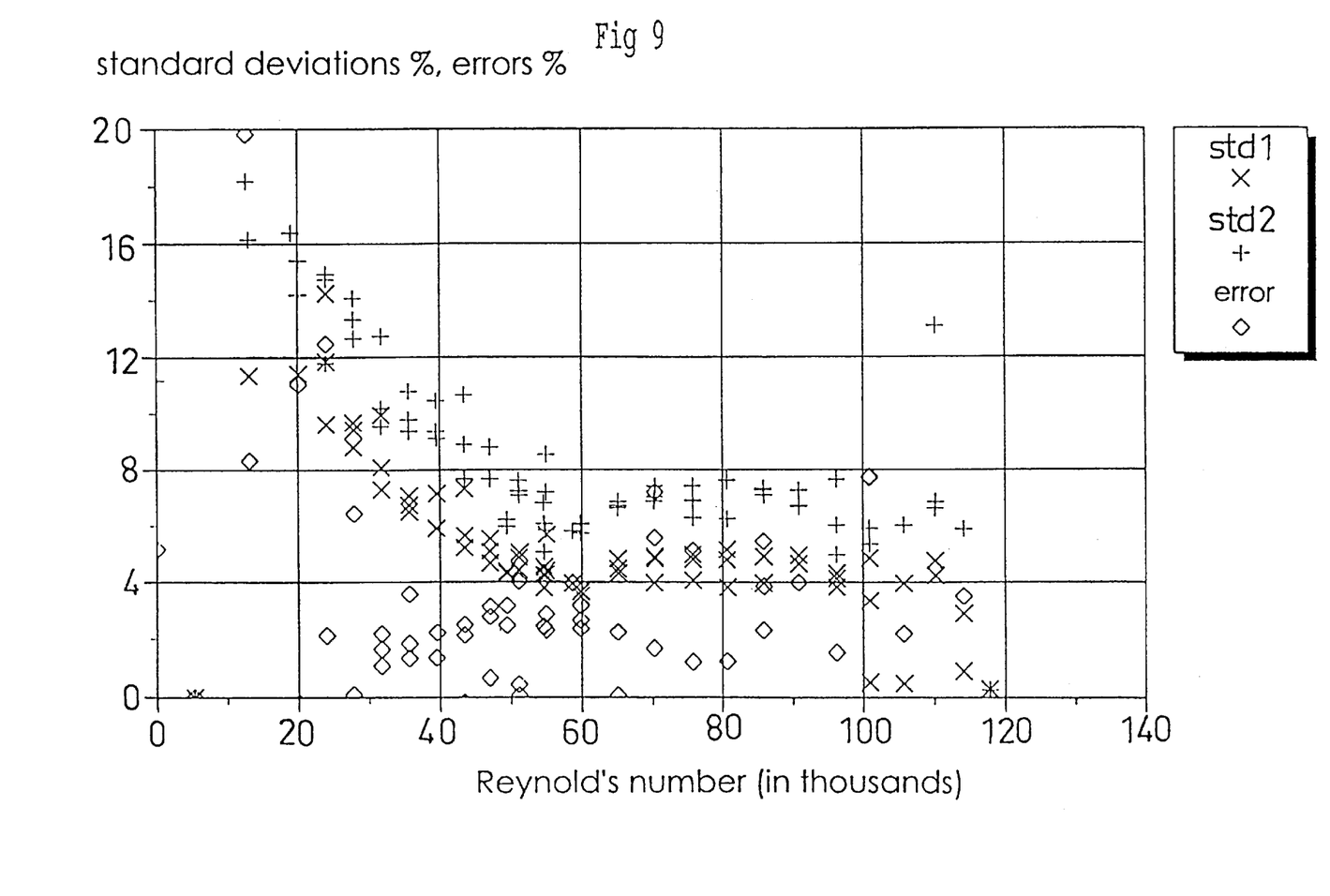

Also FIGS. 7–9 are three diagrams illustrating the standard deviation of the amplitude of a fluid flow as a function of Reynolds' number. The flows are measured in the same way as in FIGS. 4–6 and with the same installations as in FIGS. 4, 5 and 6, respectively, i.e. with a 100-tube-diameter straight stretch, with a simple tube bend and with a double tube bend in different planes, respectively. The flow has, however, been generated by a pump in these cases. Furthermore, an error curve has been drawn in the diagrams.

It appears from FIG. 7 that both the error and the standard deviations 1 and 2 are on a fairly low level for Reynolds' numbers in the range of 40,000–100,000, while both the error and the standard deviations increase considerably for lower Reynolds' numbers.

In FIG. 8, the error and the standard deviations only increase at Reynolds' numbers below 20,000, but on the other hand rise more steeply.

In FIG. 9, both the error and the standard deviations are generally on a higher level than in FIGS. 7 and 8.

There are thus clear differences as to the level of the standard deviations, at least for certain values of Reynolds' number, between different tube configurations, also when the flow is generated by a pump and thus contains pulsations. Likewise, there are clear differences between the same tube configurations, for instance FIG. 6 and FIG. 9, when the flow has been generated in different ways. Thus, this information may be used in order to detect whether the flowmeter measures correctly or not, to identify the cause or the operating conditions resulting in incorrect measurement, and if possible to correct the measurement signal from the transducer or the output signal from the flowmeter or some intermediate signal as a function of the identified operating conditions.

I claim:

1. A method used in the measurement of a fluid flow comprising the steps of:
   generating a measurement signal representing an instantaneous fluid flow using a flow transducer in a flowmeter;
   determining amplitude variations of the measurement signal for at least one predetermined period of time; and
   comparing said determined amplitude variations with reference amplitude variations based on predetermined flow conditions to decide whether the flowmeter measures said fluid flow correctly, wherein said determined amplitude variations and said reference amplitude variations are noise.

2. A method as claimed in claim 1, wherein if it is decided that the flowmeter is not correctly measuring said fluid flow, said amplitude variations are compared with a plurality of other predetermined reference amplitude variations, each of which has been determined for specific flow conditions, thereby to identify the existing flow conditions.

3. A method as claimed in claim 2, wherein the step of determining the amplitude variations of the measurement signal comprises the determination of a distribution value for the amplitude of the measurement signal.

4. A method as claimed in claim 1, wherein the step of determining the amplitude variations of the measurement signal comprises the determination of a distibution value for the amplitude of the measurement signal.

5. A method as claimed in claim 1, wherein if it is decided that the flowmeter is not correctly measuring said fluid flow frequency components of the measurement signal are determined for a predetermined period of time and compared with a plurality of sets of reference frequency components, each of which has been determined for specific flow conditions, thereby to identify the existing flow conditions.

6. A method as claimed in claim 5, wherein the step of determining the frequency components of the measurement signal comprises the determination of a frequency spectrum for the measurement signal.

7. A method as claimed in claim 5, wherein the step of determining the frequency components of the measurement signal comprises the determination of a power spectrum for the measurement signal.

8. A method as claimed in claim 1, wherein if it is decided that the flowmeter is not correctly measuring said fluid flow, the flowmeter is corrected with the aid of predetermined correction information.

9. A method used in the measurement of a fluid flow comprising the steps of:
   generating a measurement signal representing an instantaneous fluid flow using a flow transducer in a flowmeter;
   determining the frequency components of the measurement signal for at least one predetermined period of time; and
   comparing said determined frequency components with at least a first set of reference frequency components to decide whether the flowmeter measures said fluid flow correctly.

10. A method as claimed in claim 9, wherein if it is decided that the flowmeter is not correctly measuring said fluid flow, said frequency components are compared with a plurality of other sets of predetermined reference frequency components, each of which has been determined for specific flow conditions, thereby to identify the existing flow conditions.

11. A method as claimed in claim 9, wherein the step of determining the frequency components of the measurement signal comprises the determination of a frequency spectrum for the measurement signal.

12. A method as claimed in claim 9, wherein the step of determining the frequency components of the measurement signal comprises the determination of a power spectrum for the measurement signal.

13. A device for measuring fluid flows, comprising:
   a flow transducer which is adapted to emit a measurement signal representing the instantaneous flow,
   means for determining amplitude variations of the measurement signal;
   a memory in which is stored at least one set of reference amplitude variations that have been determined for a predetermined flow condition for the flow transducer; and means for comparing the determined amplitude variations of the measurement signal with said at least one set of reference amplitude variations to decide whether the device measures correctly, wherein said determined amplitude variations and said at least one set of reference amplitude variations are noise.

14. A device as claimed in claim 13, wherein the means for determining the amplitude variations of the measurement signal comprise means for determining a distribution value for the amplitude of the measurement signal from the flow transducer.

15. A device as claimed in claim 14, wherein said memory stores a plurality of sets of reference values which have been measured for different specific flow conditions, and correction data for correcting the device if it is decided that the device is not correctly measuring said fluid flows.

16. A device as claimed in claim 13, wherein said memory stores a plurality of sets of reference values which have been measured for different specific flow conditions, and correction data for correcting the device if it is decided that the device is not correctly measuring said fluid flows.

17. A device for measuring fluid flows, comprising:

a flow transducer which is adapted to emit a measurement signal representing fluid flows, means for determining frequency components of the measurement signal;

a memory in which is stored at least one set of reference frequency components that have been determined for a predetermined flow condition for the flow transducer; and means for comparing the determined frequency components of the measurement signal with said at least one set of reference frequency components to decide whether the device measures correctly.

18. A device as claimed in claim 17, wherein the means for determining the frequency components of the measurement signal comprise means for determining a frequency spectrum for the measurement signal.

19. A device as claimed in claim 18, wherein said memory stores a plurality of sets of reference values which have been measured for different specific flow conditions, and correction data for correcting the device if it is decided that the device is not correctly measuring said fluid flows.

20. A device as claimed in claim 17, said memory stores a plurality of sets of reference values which have been measured for different specific flow conditions, and correction data for correcting the device if it is decided that the device is not correctly measuring fluid flows.

21. A method for determining fluid flow comprising the steps of:

measuring an instantaneous fluid flow rate to generate an output signal;

determining noise in the measured instantaneous fluid flow rate;

comparing said determined noise with a reference noise in order to determine whether said output signal is accurate.

22. The method of claim 21, wherein said determined noise and said reference noise are amplitude variations.

23. The method of claim 21, wherein said determined noise and said reference noise are frequency components.

* * * * *